United States Patent [19]
Johnson

[11] Patent Number: 5,728,303
[45] Date of Patent: Mar. 17, 1998

[54] ELECTRO-COALESCENCE/MAGNETIC SEPARATION (ECMS) SYSTEM AND COMPONENTS FOR REMOVAL OF CONTAMINANTS FROM WATER STREAMS, INCLUDING DESALINIZATION

[75] Inventor: Dennis E. J. Johnson, Aurora, Ill.

[73] Assignee: Aqua-Ion Systems, Inc., Littleton, Colo.

[21] Appl. No.: 789,780

[22] Filed: Jan. 28, 1997

Related U.S. Application Data

[62] Division of Ser. No. 377,620, Jan. 25, 1995, Pat. No. 5,597,479.

[51] Int. Cl.⁶ .................................................. C02F 1/463
[52] U.S. Cl. ...................... 210/695; 210/716; 210/721; 210/748; 210/760; 210/798; 205/752; 205/756
[58] Field of Search ........................ 210/716, 721, 210/748, 695, 760, 767, 798, 192, 198.1, 199, 202, 203, 205, 222, 243, 266, 275, 278, 279, 289, 291, 484, 490, 493.1, 493.5, 792, 807; 204/639, 664, 665; 205/747, 752, 756

[56] References Cited

U.S. PATENT DOCUMENTS

| | | | |
|---|---|---|---|
| 3,186,929 | 6/1965 | Ripple | 204/155 |
| 3,326,382 | 6/1967 | Bozek et al. | 210/484 |
| 3,552,553 | 1/1971 | Reading | 210/484 |
| 3,697,420 | 10/1972 | Blaisdell et al. | 210/695 |
| 3,747,768 | 7/1973 | Barrera | 210/288 |
| 4,094,783 | 6/1978 | Jackson | 210/703 |
| 4,116,840 | 9/1978 | Butterworth | 210/279 |
| 4,238,326 | 12/1980 | Wolf | 210/695 |
| 4,343,707 | 8/1982 | Lucas | 210/695 |
| 4,382,866 | 5/1983 | Johnson | 210/748 |
| 4,562,014 | 12/1985 | Johnson | 261/76 |
| 4,563,286 | 1/1986 | Johnson et al. | 210/721 |
| 4,655,933 | 4/1987 | Johnson et al. | 210/748 |
| 4,857,204 | 8/1989 | Joklik | 210/695 |
| 4,956,080 | 9/1990 | Josefik | 210/109 |
| 5,192,423 | 3/1993 | Duczmal et al. | 209/164 |
| 5,413,710 | 5/1995 | Roberts et al. | 210/274 |
| 5,443,719 | 8/1995 | Johnson et al. | 210/101 |

FOREIGN PATENT DOCUMENTS

| | | |
|---|---|---|
| 478770 | 7/1929 | Germany . |
| WO8102685 | 10/1981 | WIPO . |

*Primary Examiner*—Peter A. Hruskoci
*Attorney, Agent, or Firm*—Michael de Angeli

[57] ABSTRACT

An improved electro-coalescent/magnetic separation (ECMS) system for removing contaminants from water, including desalinization, comprises a device for exposing a stream of water to be treated to an electric field, followed by introduction of ionized coagulating substances, including ionized gases and/or metal ions, followed by plural filter stages. The first filter stage may comprise a polarizable glass, alumina, or ceramic media provided as a bed in a tank with an underdrain, so as to provide substantial residence time. A polishing filter may comprise a very fine fiber or organic gel filter element confined between relatively flexible electrically-conductive screen members and provided with a DC power supply to polarize the filter. This assembly is confined between relatively rigid, perforated members such that the filter assembly can move slightly upon backwash to dislodge caked-on contaminants or the like, while preserving the structural integrity of the filter assembly.

11 Claims, 6 Drawing Sheets

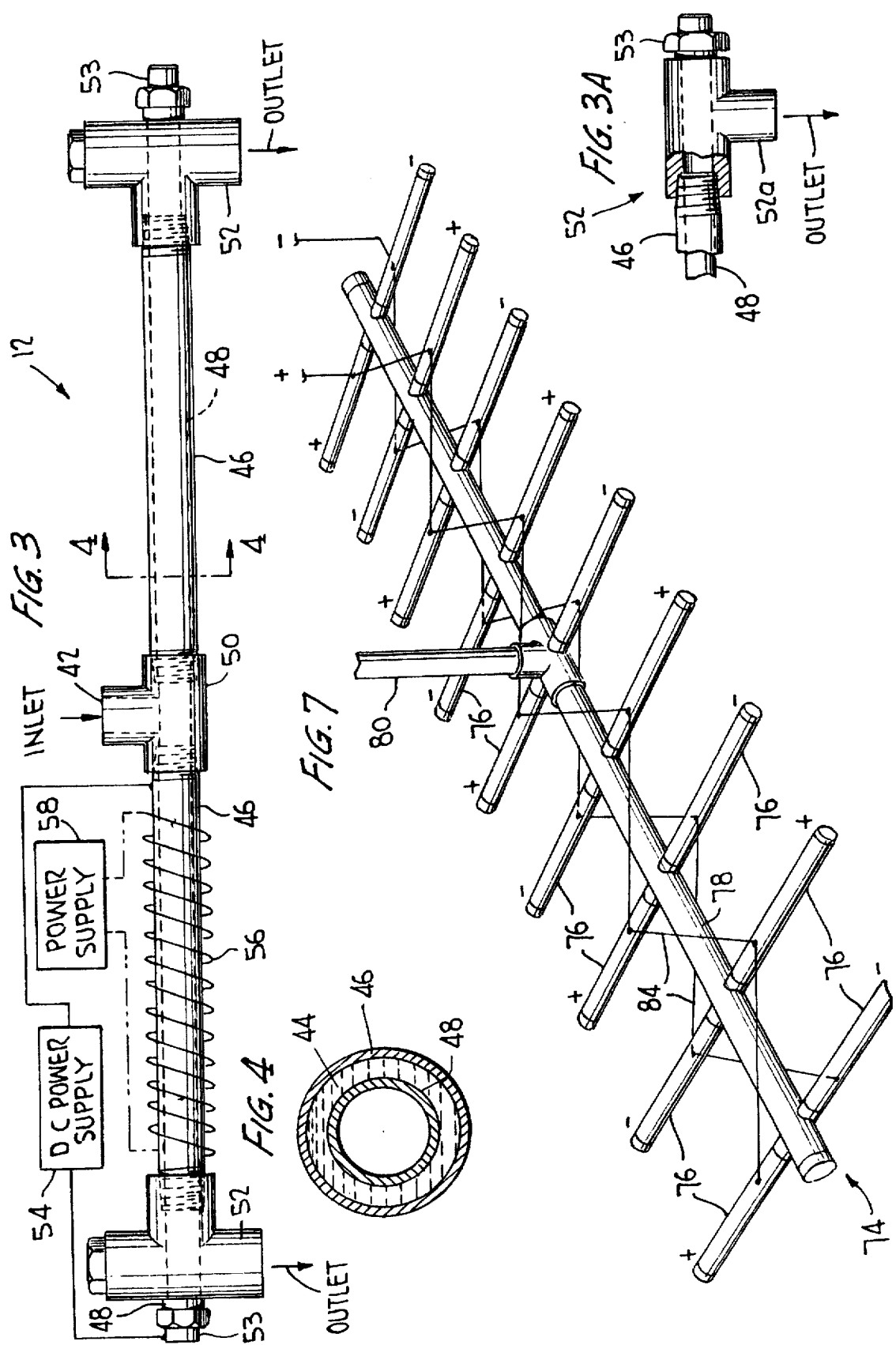

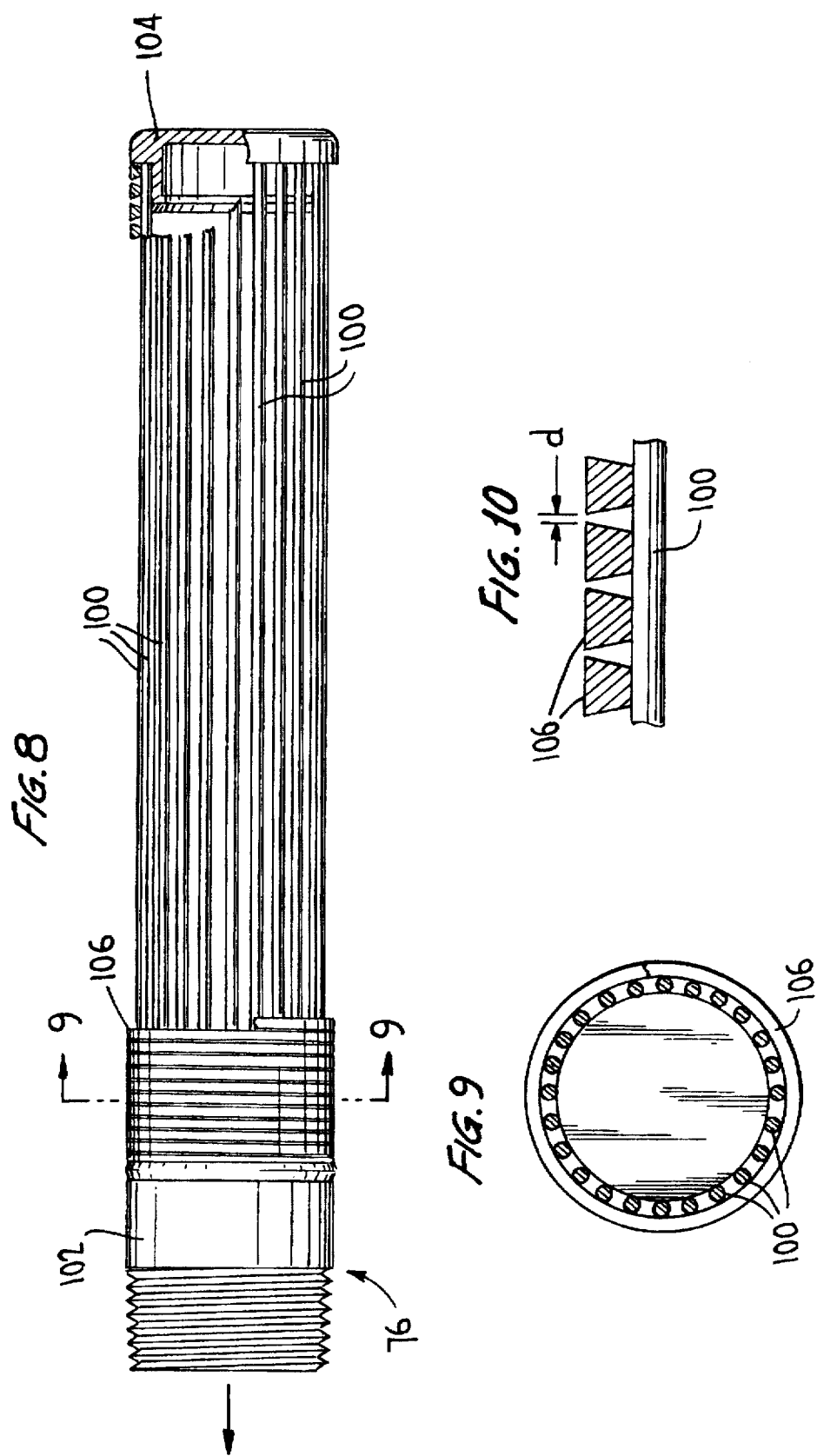

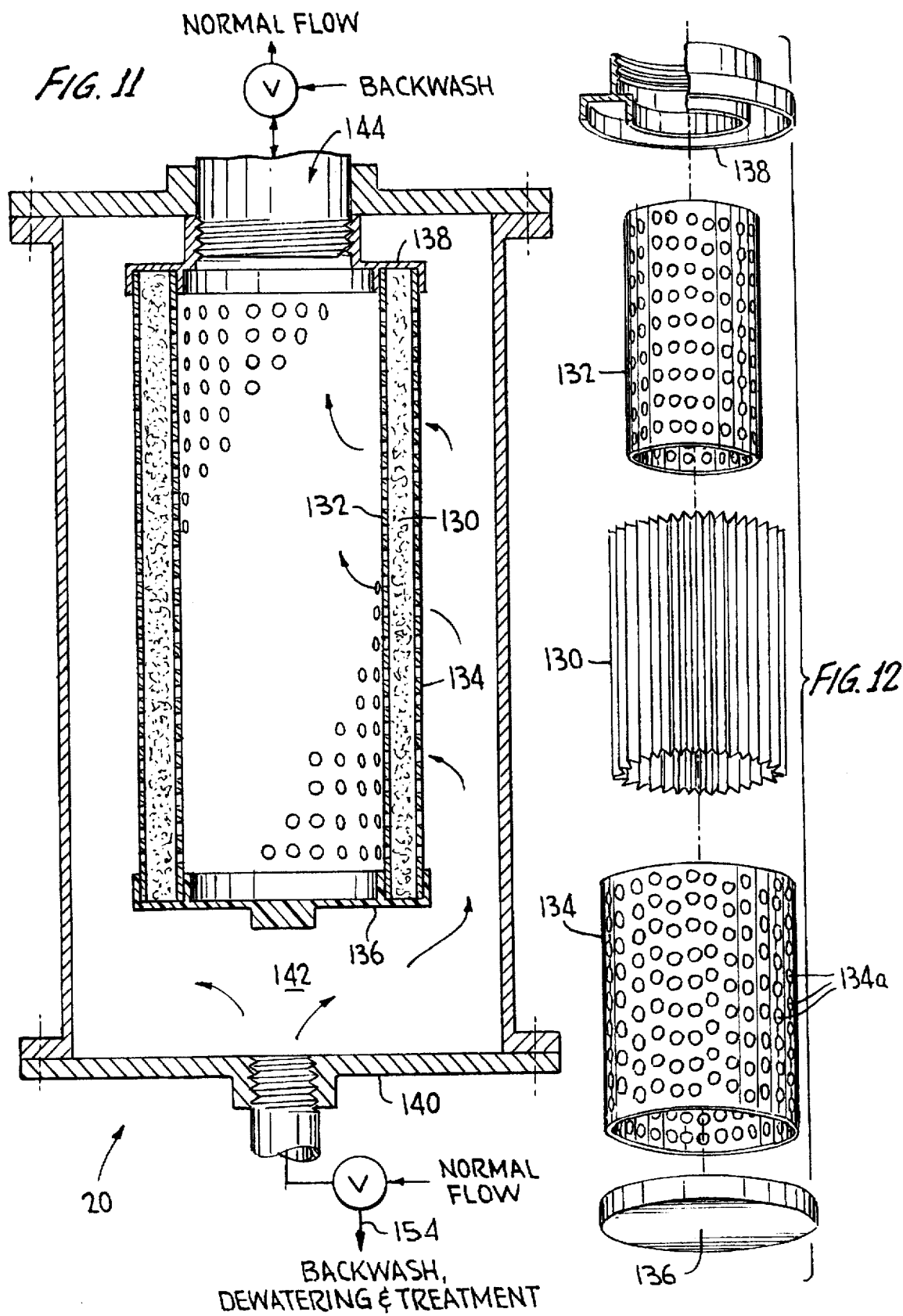

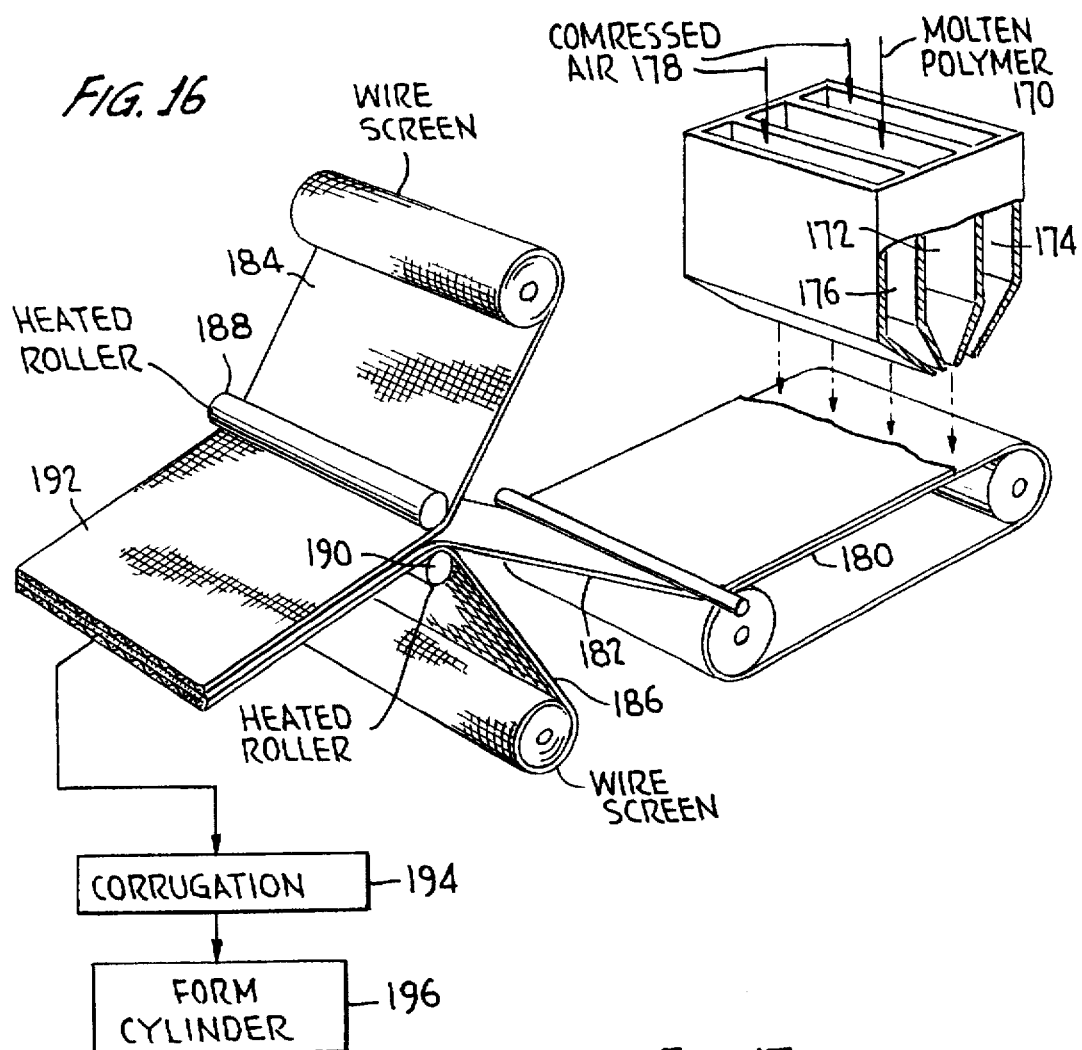
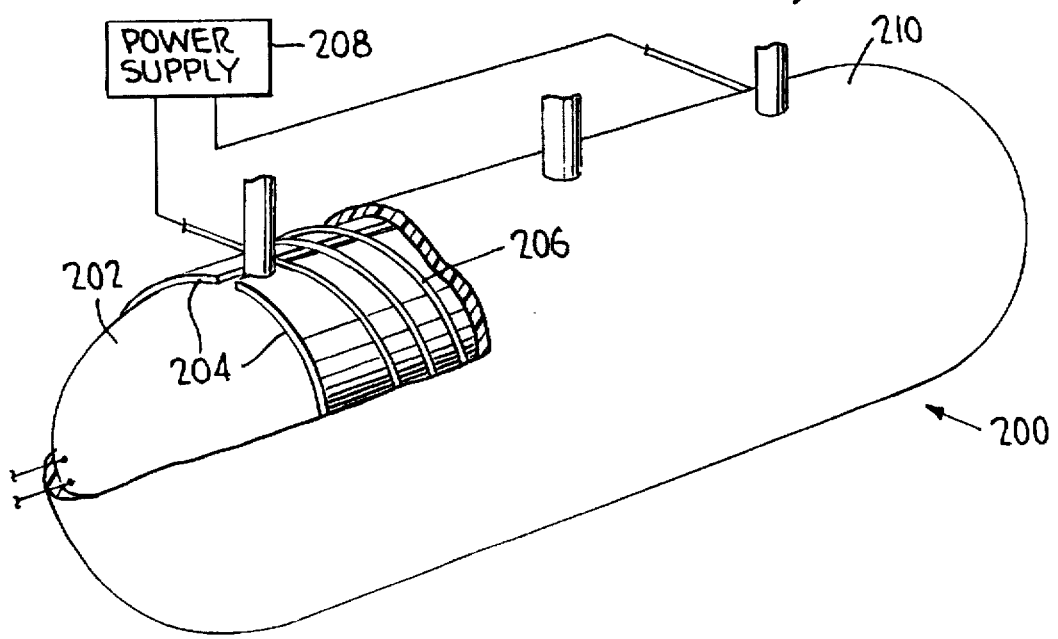

ELECTRO-COALESCENCE/MAGNETIC SEPARATION (ECMS) SYSTEM AND COMPONENTS FOR REMOVAL OF CONTAMINANTS FROM WATER STREAMS, INCLUDING DESALINIZATION

This is a divisional application of application Ser. No. 08/377,620 filed Jan. 25, 1995, now Pat. No. 5,597,479.

FIELD OF THE INVENTION

This invention relates to improved methods and systems for removal of contaminants of various types from streams of water, including desalinization of salt water as well as removal of contaminants from polluted fresh water streams and the like. The invention also includes certain specific components which can be used in various water purification processes.

BACKGROUND OF THE INVENTION

The present inventor has been working for many years in the field of removal of contaminants from water streams without addition of chlorine or other disinfecting chemicals thereto. Without implying any limitation on the scope of the invention disclosed and claimed herein, the inventor's efforts have been largely directed to removal of dissolved and ionized compounds and contaminants by exposing the water stream to one or more of ionized gas molecules, strong electric or magnetic fields, and metal ions, all of which tend, under appropriate circumstances, to "coagulate" or "coalesce" the contaminants into larger particles, which can then be removed from the water stream by physical or electrically and/or magnetically stimulated filtration processes. These techniques are referred to broadly as electro-coalescence and magnetic separation (ECMS); the present invention relates to further improvements therein.

More specifically, the inventor, in some cases with other inventors, has been granted U.S. Pat. Nos. 4,382,866, 4,562,286, 4,655,933, and 4,562,014, all directed generally to this subject matter. Pat. No. 4,382,866 to the present inventor is relevant to one aspect of the present invention in that the "'866" patent shows a particular electrochemical system for liquid filtration useful in desalinization of water which, as indicated above, is one of the particular water decontamination processes addressed by the present invention. In the '866 patent, desalinization is accomplished by passing a stream of water through a fine-fiber filter element disposed between metallic supporting screens on either side thereof. The screens are electrically isolated from one another, and have a potential difference applied thereacross such that an electric field exists across the filter element. The effect is to remove very finely divided solids, particulates, and materials in solution, including ions of various salts, from the water. Thus, the '866 patent shows a system useful in desalinization of water. However, the specific structure of the filter element discussed therein was not amenable to convenient back-flushing, such that the useful life of the filter was limited.

More recently, the inventor and another filed copending application Ser. No. 08/200,749 on Feb. 23, 1994, and the inventor filed Ser. No. 08/326,339 on Oct. 20, 1994.

Ser. No. 08/200,749, which is incorporated herein by this reference, is directed, as indicated generally above, to removal of contaminants from a water stream by adding ionized gases and other materials to a water stream and subjecting the water stream to a combination of electric and magnetic fields under specific flow conditions. Without limiting the scope of the claims thereof, the principal component disclosed therein is a device referred to in the present application for convenience as a "turbulator". In this device, a water stream to be treated is thoroughly mixed with a stream of ionized coagulant materials in air, introduced into the water stream in a venturi. The water stream is introduced into a large-diameter bottom section of a vertically elongated vessel in communication with an annular space between inner and outer tubes, the annular space terminating at an upper enlarged chamber. The water and ionized coagulant stream is introduced off-axis such that the water tends to travel spirally upwardly in the annular space. In the upper enlarged chamber, the stream enters an upper open end of the inner tube and moves downwardly to exit the turbulator unit. A coil is provided around the central section of the device, so as to subject the water stream to a relatively intense magnetic field during its passage through the unit. As will be indicated more specifically below, the "turbulator" unit may be used in systems disclosed and claimed herein.

Ser. No. 08/326,339, also incorporated herein by reference, is again directed to removal of contaminants from water streams by mixing ionized materials with the water stream and subjecting the stream to electric and magnetic fields where appropriate. This application discloses an apparatus for generating a stream of ionized gas from the air, and also shows a convenient device for introducing metal ions into the water stream, both of which tend to coagulate contaminants for subsequent physical removal by filtration. Furthermore, the metal ions form bactericidal, viricidal, and fungicidal compounds in situ, so as to efficiently remove biological contaminants from the water stream. The teachings of this application are also applicable to the present invention, in particular where they may be useful in connection with certain specific contaminant streams to be purified.

The present invention, as discussed above, relates to improved electro-coalescent/magnetic separation (ECMS) systems for purification of various types of contaminated water streams, including desalinization of salt water. Systems for so doing incorporate specific devices shown in the two previous co-pending applications, as well as novel components disclosed herein.

OBJECTS AND SUMMARY OF THE INVENTION

It is therefore an object of the invention to provide improved ECMS systems for purification of contaminated water streams, including desalinization of salt water, and improved components for such systems, whereby such systems can be adapted to purification of specific water streams.

It is a further object of the invention to provide a device for efficiently subjecting a water stream to a relatively intense electric field so as to further accelerate combination of ionized materials therein for physical removal.

It is a further object of the invention to provide an improved primary filter for removing particles of 1–10 microns and greater mean diameter from a water stream.

It is a further object of the invention to provide a specific device for final polishing of a water stream, e.g., for removal of particles in the 0.05–0.1 micron range and greater mean diameter, ions, salts and the like, and which can be readily backwashed as necessary so as to retain its efficiency over time.

It is a further object of the invention to provide an ECMS system for decontamination of water, in particular desalinization, which can be assembled of standard valves, tanks, pipe and pipe fittings, and related components to the maximum degree possible, such that the benefits of the invention are available at economical cost in countries not having a substantial manufacturing base, i.e., so that the system of the invention can be assembled using commonly-available components at low cost to the greatest degree possible.

A typical ECMS system for the treatment of water according to the present invention includes an apparatus for efficiently subjecting a water stream to an intense electric field, comprising two coaxial metallic tubes; the water stream passes down an annular passageway between the coaxial tubes. The tubes are electrically conductive but insulated from one another, so that an electric potential can be applied thereacross, resulting in a strong radial electric field in the annular passage through which the water stream passes. The result is to "electro-coalesce", that is, precoagulate contaminants in the water stream, forming more readily filtered particles for subsequent removal.

The improved primary filter of the invention comprises a tank wherein the water of the stream is retained for some substantial average residence time. The tank is approximately half full of a finely divided polarizable media which may include crushed or milled glass, ceramics such as silica and alumina porcelain, and combinations thereof. Water enters the tank at the top and flows downwardly through the media, being removed from the bottom of the bed of media by an underdrain, comprising a number of pipes having small-dimension openings therein and connected to a manifold in communication with an outlet pipe. The manifold is electrically insulated, and alternate ones of the underdrain pipes are connected to a source of electric potential, so that the media in the vicinity of these pipes is polarized, improving the efficiency of the separation process.

The individual filtering members of the underdrain may each comprise a support assembly of parallel steel rods, welded to a pipe nipple at one end and to a closure member at the other. This support assembly is then wrapped spirally by a wire, individual wraps of the wire being spaced from one another to define the small-dimension openings needed to admit water while excluding the polarized media. Preferably, the wire and the support assembly, including the rods, pipe nipple, and closure member, are all of stainless steel, and are assembled by welding. The wires may be keystone-shaped in cross-section for convenient assembly. The wall of the tank may further include conductive members across which a DC potential is applied, further polarizing the media.

The improved final polishing filter according to the invention comprises a very finely porous filter member, typically either a web of very fine polyester, polyethylene, polypropylene, or other polymer fibers, a water-permeable organic gel, or combinations of both, confined between relatively flexible electrically conductive electrode support screen members. This structure may be formed from a three-layer sandwich precursor having the electrode support screens heat-bonded to either side of the filter member. The precursor may be creased to define a number of generally parallel creasing lines and rolled into a cylinder, thus providing a cylindrical filter member having longitudinal corrugations stiffening the filter member and increasing its effective surface area. This corrugated cylindrical filter member may then be disposed between relatively rigid annular perforated tube members in order to provide additional support to the filter assembly. This assembly in turn is placed in a canister, such that water to be filtered is admitted to an influent plenum area outside the filter assembly, and passes radially inwardly through the filter, exiting through an outlet in communication with the center of the cylindrical filter member. When it is desired to backwash this filter, the water flow pattern is reversed, whereby the corrugated cylindrical filter is forced against the outer of the annular perforated tube members. Individual panels between the creased lines then flex, thus efficiently dislodging any caked-on contaminant materials for subsequent dewatering, filtering, and suitable disposal.

BRIEF DESCRIPTION OF THE DRAWINGS

The invention will be better understood if reference is made to the accompanying drawings, in which:

FIG. 3 shows a side view of an electrocoagulator assembly for subjecting a water stream to a relatively intense electric field and, optionally, a magnetic field;

FIG. 3A is a view of an alternative construction of one end of the assembly of FIG. 3;

FIG. 4 is a cross-section along line 4—4 of FIG. 3;

FIG. 7 is a perspective view of the underdrain assembly of the filtration unit shown in FIGS. 5 and 6;

FIG. 8 is an elevational view, partly cutaway, of one of a plurality of substantially identical filtration assemblies used in the underdrain assembly of FIG. 7;

FIG. 9 is a cross-section along line 9—9 of FIG. 8;

FIG. 10 is an enlarged view of a portion of FIG. 8;

FIG. 11 is a cross-sectional view of a final polishing filter according to the invention;

FIG. 12 is an exploded perspective view of the central assembly of the final polishing unit of FIG. 11;

FIG. 16 is a perspective schematic view showing typical steps in manufacture of the filter assembly; and FIG. 17 is a perspective, partly cut-away view of a particular structure for a tank for the primary and secondary filtration unit.

DESCRIPTION OF THE PREFERRED EMBODIMENTS

As indicated above, this invention relates to electrocoalescent/magnetic separation (ECMS) systems for removal of various contaminants from water streams, including desalinization. The invention also includes certain new components for ECMS systems of this type. Streams usefully treated by the invention include, but are not limited to, swimming pool water, laundry and vehicle wash water, airport deicing wash water, low-level radionuclide wastewater, drinking and ground water, industrial and commercial water streams, gray water streams of various types, and so on, including desalinization. Each use requires optimization of the system's parameters and components to suit the particular water stream. Therefore, while two specific embodiments of systems for treatment of specific water streams are described in detail hereafter with respect to FIGS. 1 and 2, these do not limit the applications of the invention. Nor is the invention to be limited to entire systems; certain claims appended hereto are directed to individual components disclosed herein that are useful separately and may also be used for purposes other than water treatment per se, such as treatment of blood, e.g. for dialysis or the like, and other liquids.

Figure 1:
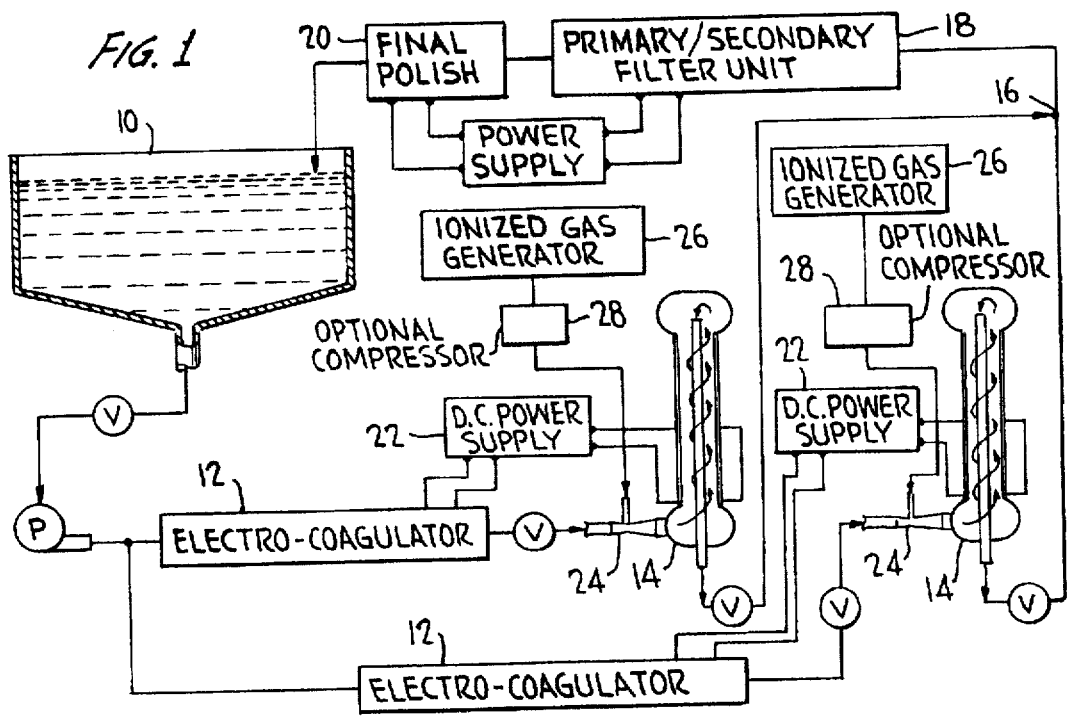
FIG. 1 shows schematically a first embodiment of an ECMS system according to the invention.

Thus, FIG. 1 shows one example of an ECMS system for treatment of water according to the invention, in this case, for example, removal of biological and heavy metal contaminants and the like from ground water. A tank 10 containing ground water is connected to two parallel sets of common treatment units, in this case including first and second electrocoagulators 12, detailed below in connection with FIGS. 3, 3A, and 4, and first and second turbulators 14, which may be essentially as described in copending Ser. No. 08/200,749. The water streams leaving turbulators 14 are recombined at a tee 16 and flow into primary-secondary filter unit 18 which may be as detailed below in connection with FIGS. 5–10. Finally, the water is given a final polishing in a final polishing filter 20, detailed below in connection with FIGS. 11–15. Both filters 18 and 20 employ magnetic separation techniques. Thus, the ECMS system according to the invention avoids chemical coagulants and the like in favor of electrically-stimulated coagulation or coalescence of small contaminants, forming larger particulates, followed by magnetically-enhanced physical filtration. Of course, ECMS systems according to the invention may include additional components as well.

More specifically, the water stream leaving tank 10 is subject to a relatively intense transverse electric field in the electrocoagulator units 12 connected to DC power supplies 22. After leaving the electrocoagulator units 12, the water stream passes into venturis 24 also generally as discussed in Ser. No. 08/200,749, wherein a stream of ionized gas provided by ionized gas generators 26 is introduced into the water stream. Suitable ionized gas generators are disclosed in Ser. No. 08/326,339. Briefly, a stream of atmospheric air is exposed to ultraviolet or other electromagnetic radiation in the presence of electric and/or magnetic fields, ionizing a substantial portion of the oxygen and nitrogen therein. The ionized gas tends to coagulate various contaminants found in the water stream, particularly after pre-treatment in the electrocoagulators 12. As indicated, the gas stream may be increased in pressure by compressors indicated generally at 28. As disclosed in Ser. No. 08/200,749, the streams of ionized gas are preferably introduced into the water stream at venturis 24, and the combined streams are thoroughly mixed during flow through turbulators 14; electric and magnetic fields may be applied simultaneously.

The water streams leaving the turbulators 14, having been subjected to electric and magnetic fields as discussed in Ser. No. 08/200,749, then enter a primary/secondary filter unit 18. As discussed in detail below, filter unit 18 comprises a tank containing a large bed of finely-divided glass and/or ceramic polarizable filter media. This material serves to physically filter and/or magnetically separate coagulated materials, particularly when polarized by application of an electric current thereto. The water is drained from the base of the primary/secondary filter unit 18 by an underdrain so that the media remains in the tank while the water stream is removed therefrom. The underdrain includes elements having an electric potential applied thereto to polarize the media.

In final polish unit 20, the water stream is passed through a filter having very finely divided pores, provided by either a mat of very fine inert fibers of polyester, polyethylene, or polypropylene materials, or the like, or a micro-porous organic gel. When provided between oppositely-charged screen members, either is suitable to filter out salts and the like while passing water molecules.

As indicated above, the enumeration of various components in the system of FIG. 1 does not exclude other components from being added thereto; in particular the ion addition units shown in Ser. No. 08/326,339, which release metal ions into a water stream, thus forming disinfectant compounds in situ, may usefully be added to the system of FIG. 1 if the water to be treated contains biological contaminants, e.g., bacteria, viruses, or fungi to be killed. Ultraviolet sterilization may also be employed. Settling tanks and coarse filters to remove large contaminants may also be introduced prior to the electrocoagulators.

Figure 2:
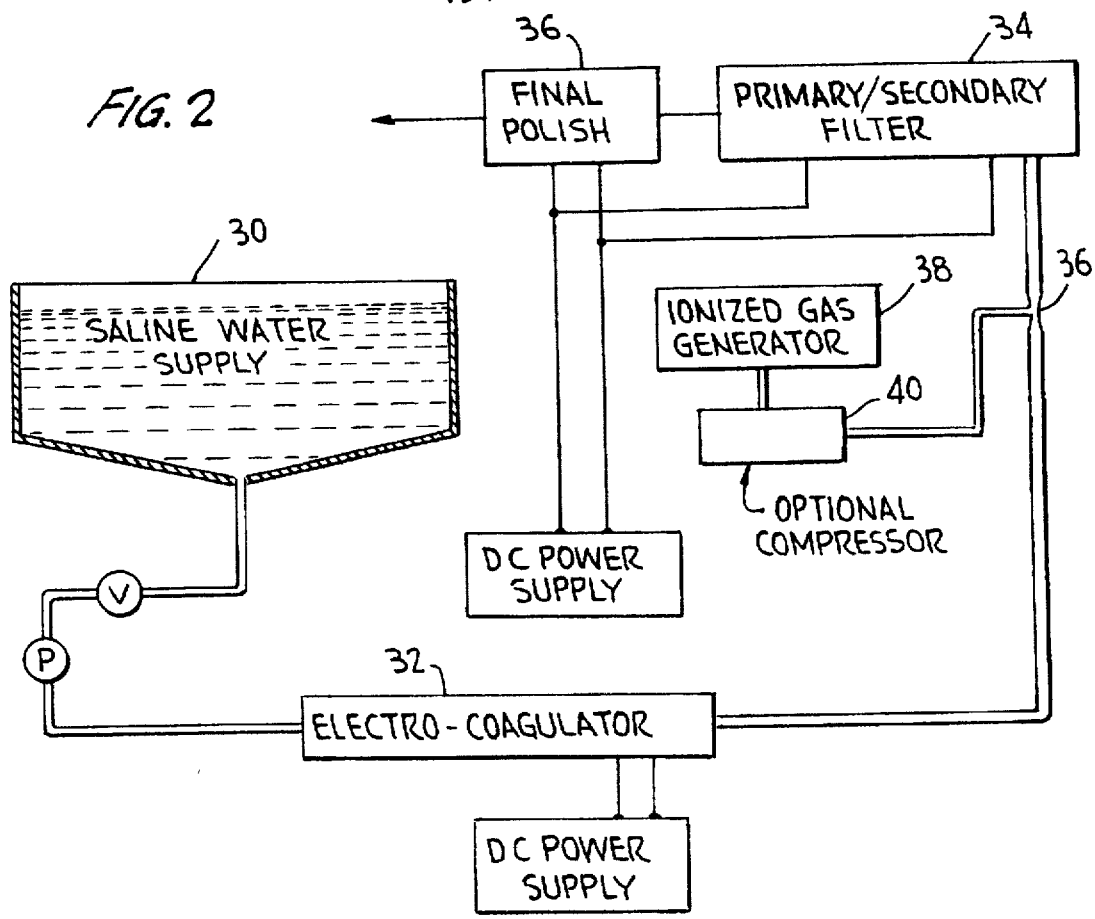
FIG. 2 shows a similar diagram of a second embodiment of an ECMS system according to the invention.

As indicated, FIG. 2 shows a second embodiment of the system according to the invention for treatment of a water stream, in this case salt water to be desalinized. Water supplied from a tank 30 is first passed through an electrocoagulator 32. An ionized gas stream from a generator 38 is introduced at a venturi 36, employing an optional compressor 40 if needed. A primary/secondary filter 34 is followed by a final polish indicated at 36. As indicated above, this system may also be significantly modified depending on specific requirements and the quality of the water to be desalinized; obviously physical filtration, further magnetic filtration, biological killing, and/or addition of metal ions and the like may be required, depending on the exact nature of the water to be treated.

FIGS. 3, 3A, and 4 detail the electrocoagulator unit 12 in FIG. 1. A similar unit appears at 32 in FIG. 2. Further, where convenient, an electrocoagulator may be assembled to the top of the tank of the primary/secondary filter 18, as indicated in FIG. 5.

The electrocoagulator unit 12 shown in FIGS. 3, 3A, and 4 exposes a stream of water to an intense electric field. Water entering at inlet 42 is passed down an annular passage 44 (FIG. 4) between outer and inner metallic tubes 46 and 48, respectively. Inner tube 48 extends the length of the unit, as shown, while the outer tube 46 is provided in two sections, threaded into an inlet tee 50 and two outlet tees 52. As shown in FIG. 3, the sections of the outer tubing 46 are threaded into the tees, while the inner tube 48 extends therethrough and is sealed to the end tees 52 by compression fittings 53. In an alternative arrangement shown in FIG. 3A, the end tees 52 may be turned such that the compression fittings 53 are threaded into the end of the head of the tees 52 opposite the ends into which are threaded the outer tubes 46; the tails 52a of the tees 52 then form the outlet fittings.

The tees 50 and 52 are formed of insulative material, typically PVC plastic. A DC power supply 54 is connected across the inner and outer tubes 48 and 46, as indicated, and provides 12–24 volt DC power, in the range of 5–30 amperes, typically switched in polarity on the order of once per minute, so that an electric field extends radially in the annular space 44 between the inner and outer tubes. The inner and outer tubes may be formed of aluminum and steel pipe materials, respectively, or may be reversed. In either case, the effect of the DC potential is to gradually erode away these materials, providing metal ions in the water stream which serve as additional nuclei for coagulation or coalescence of contaminants therein, enabling subsequent physical filtering to be performed effectively. The presence of the electric field also promotes oxidation and reduction of contaminants in the water stream, such that the electrocoagulator provides a chemical disinfection function. A second DC power supply 58 may be connected to a coil 56 extending around one or both of the coaxial tube assemblies, to exert a magnetic field in the water stream to the same effect, applying 12-24 volts DC in the 1-10 ampere range.

Figure 5:
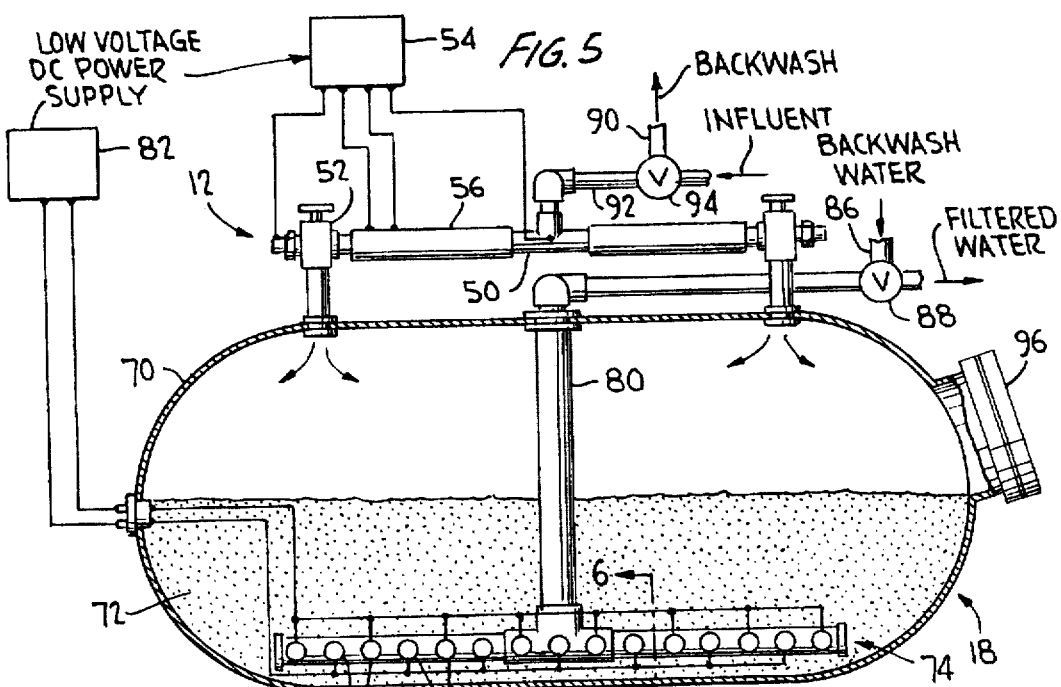
FIG. 5 shows the overall arrangement of a primary and secondary filtration unit according to the invention, also including, as an option, the unit of FIGS. 3–4.

As indicated above, FIG. 5 shows an overall view of the primary/secondary filter unit 18 of FIG. 1, unit 34 of FIG. 2 being generally similar. In the embodiment shown, the electrocoagulator 12 is mounted on top of the tank 70 of the primary/secondary filter unit such that the outlets of the electrocoagulator 12 form the inlets to primary/secondary filter unit 18. Alternatively, or additionally, the electrocoagulator 12 can be separate as shown in FIGS. 1 and 2.

The filtration element of the primary/secondary filter unit 18 is a bed 72 of a finely-divided media, typically "milled" mesh size glass, silica or alumina ceramics, or mixtures thereof, crushed or ground to between about 30 and 100 mesh particle size. These materials contain various known constituents such as silica, typically in amounts of 10 to 75 percent, alumina between 2 and 30 percent, kaolinite clay in various percentages, potash, feldspar, and various mineral oxides. The media may be homogenous throughout bed 72, or may be provided in various proportions depending on availability, cost, and the specific contaminants to be removed. The materials named are chosen for their ability to effectively filter relatively larger particulates, 1-10 microns and up, from a water stream, particularly when polarized by application of relatively low-voltage DC to electrodes in appropriate configuration.

Figure 6:
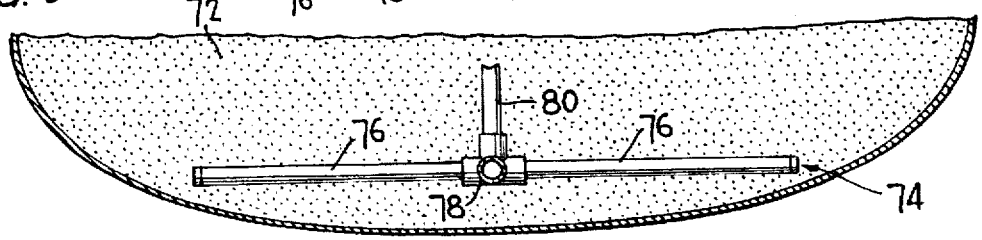
FIG. 6 is a cross-section along line 6—6 of FIG. 5.

Suitable electrodes are provided by the underdrain assembly 74 shown in FIGS. 6 and 7. As there shown, the underdrain assembly 74 may comprise a number of individual tubes 76 each defining a large number of openings of relatively small dimension in communication with a manifold 78 in turn connected to a drain tube 80 providing a drain from the tank 70. The detailed structure of the underdrain tubes 76 is discussed in connection with FIGS. 8-10. As indicated in FIGS. 5 and 7, alternate ones of the spaced tubes 76 are connected to positive and negative terminals of a power supply 82 supplying low-voltage DC, typically at 12 volts and 0.5-5 amperes, the polarity of which is switched at intervals on the order of minutes, to prevent differential erosion of the materials of the tubes. In order that this may be done, the manifold 78 must be an insulator; PVC pipe is adequate for the this purpose. As shown, preferably the polarity of alternate ones of tubes 76 is respectively reversed; connections 84 to accomplish this are shown schematically in FIGS. 5 and 7.

As indicated by the legends in FIG. 5, when it is necessary to backwash the bed 72 of filter media, backwash water is introduced at fitting 86 connected by a 3-way valve 88 to the normal outlet pipe 80, such that the water flows in the reverse pattern, out through the underdrain tubes, and exiting tank 70 via a backwash drain 90 connected to the influent pipe 92 by a second 3-way valve 94 in communication with the inlet tee 50 of the electric coagulator unit 12, if used in the configuration shown. As shown, tank 70 may be a conventional horizontal fiberglass tank, e.g., seven feet long by roughly 36 inches in diameter and provided with a media fill port 96, all as conventionally used and conveniently available, in accordance with the stated object to provide the system of the invention using conventional components and technologies available in less developed countries. In some circumstances, it may be preferable to employ a vertically-elongated tank to increase the residence time of water in the media.

FIG. 17 shows an alternative construction for the tank, in this embodiment denominated 200, which may replace the conventional fiberglass tank 70 of FIGS. 5 and 6. In this embodiment, tank 200 comprises an internal plastic liner 202, over which are assembled facing C-shaped electrically-conductive sheet elements 204, typically of 16 gauge steel, thus defining a pair of generally C-shaped sheet-like members disposed over substantially all of a cylindrical central portion of tank 200. A coil of insulated wire 206 encircles this assembly in solenoid fashion, and is connected to a power supply 208, providing DC at 12 volts and 20-30 amperes. Thus, C-shaped ferro-magnetic members 204 serve as pole pieces for the solenoidal electromagnetic field provided by coil 206. When power supply 208 is energized, the filtration media within the tank 200 is additionally polarized due to the electromagnetic field provided by coil 206, increasing the magnetic separation of contaminants from the water stream. The entire assembly is encapsulated by fiberglass as indicated at 210, providing a structure of great integrity. The other connections and elements of the assembly may be as discussed previously, including the possible vertical orientation of the tank.

As discussed above, FIGS. 8-10 show the detailed structure of the underdrain tubes 76. These each comprise a number of spaced parallel cylindrical rods 100 which are welded at one end to a pipe nipple 102 and at their other end to a closure member 104, forming a precursor assembly. Wrapped over the precursor assembly of the pipe nipple 102, the rods 100, and the closure member 104 is a continuous wire member 106. FIG. 10 details the structure of the wire 106 and illustrates that the wire is of keystone cross-sectional shape. The wire is arranged such that the narrow dimension of the keystone abuts rods 100, and its wider dimension faces outwardly. The wires 106 are spaced from one another along the rods 100 at manufacture, so that a narrow dimensional opening of width d exists between each adjoining wire; this dimension d is selected to be less than the mean diameter of the particles of the media 72, so that water can flow therebetween, thence between the spaced rods 100, and thus into the interior of the underdrain pipe assemblies so as to reach manifold 78 and hence be drained from the tank 70, while excluding the media.

In manufacture of the underdrain assemblies, rods 100 are welded to the pipe nipple 102; the closure member 104 is then welded to their opposite ends, forming a precursor member. In order to conveniently allow welding of these materials, and to ensure their durability in use, they may all be made of a readily weldable stainless steel alloy. The precursor assembly is then wound with the wire 106 which may be spotwelded to the precursor assembly at intervals, to ensure that the desired spacing d of adjacent wraps of the wire is achieved. The effect is to provide a large number of very small-dimension openings between the wire wrapped over the rods, so that the media 72 are excluded, while water passes freely to the interior of the pipe assembly 76.

FIGS. 11-15 detail the structure of the final polishing filter 20 of the FIG. 1 system, also corresponding to the final polishing filter 36 of FIG. 2. As indicated above, the function of this final polishing filter 20 is to remove ions, such as dissolved salts, and very fine dissolved solids of 0.05-0.1 micron and greater mean diameter, and the like, while permitting passage of water without substantial flow restriction. The inventor's Pat. No. 4,382,866 discloses a filter (see FIG. 4A) wherein a fibrous mat material was disposed between metallic screens. The mat of fibrous material was stated therein to comprise nylon, polyester, rockwool, or slagwool fibers. The screen wires on either side of the mat were isolated from one another, so that they could be connected to a power supply to polarize the material therebetween. This filter was assembled by rolling up a "sandwich" of two screens with a fiber mat therebetween in spiral "jelly-roll" fashion. This filter assembly was substantially useful in removing dissolved salt from water for desalinization; however, it proved difficult to backwash this filter assembly adequately due to its multiple-layer construction. The structure of FIGS. 11-15 employs comparable basic filter components, or alternatives discussed below, but provides a structure permitting satisfactory backwash while preserving the structural integrity of the filter member, as is necessary for reliable operation.

Figure 13:
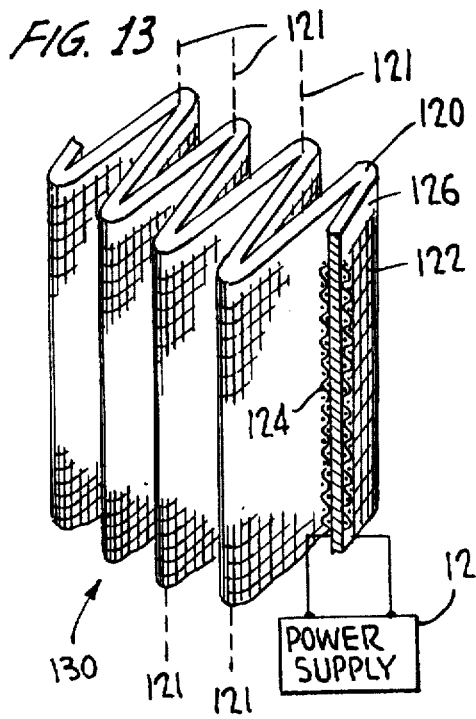
FIG. 13 is an enlarged perspective view of a portion of the filter assembly of the final polishing unit.

As shown in FIG. 13, the polishing filter includes a microporous membrane filter element 120, which may for example be a mat of very fine polyester, polyethylene, or polypropylene fibers, or other fibers, or a microporous gel, or a microporous gel faced on one of both sides by a mat of fine fibers. This microporous membrane filter element 120 is faced on either side with substantially continuous stainless steel or other conductive screen members 122, 124, providing physical support to the filter elements, thus forming a filter assembly 130. The stainless steel screens on either side of filter element 120 are electrically isolated from one another, e.g., do not reach the very ends of the filter element 120, as indicated at 126, so that a potential can be applied thereacross from a suitable power supply 128. Providing this power supply (e.g., 6-12 VDC at 50-1000 ma) polarizes the material of the filter element 120, so that ions, such as metallic and chloride ions and other anions and cations found in salt water, as well as other salts and other fine contaminants not removed by primary/secondary filter 18, adhere to the filter 130.

It is essential to backwash this filter assembly 130 from time to time, to remove accumulated salts and other contaminants, and of course this must be done without disturbing the structural integrity of the filter assembly 130. While the stainless steel screens 122, 124 provide some structural support to the filter element 120, which may in fact be quite weak by itself, it is important that the filter assembly 130 be supported more positively. Accordingly, the filter assembly 130 is provided between coaxial perforated substantially rigid support members 132 and 134 in turn captured between and sealed to opposed end cap members 136, 138; this assembly is then sealed within a housing 140. In normal use, water to be finally polished is admitted to a plenum 142 formed within sealed housing 140, outside the outer support member 134. Providing a plenum for the influent water outside the perforated member 134 ensures that water pressure is equalized over the surface of filter element 120. Water flows through flow dispersing perforations 134a in member 134, through the outer screen 124, and thence through the pad 126, where very fine contaminants, ions, and the like are filtered physically and electrically from the water stream. Screen 122 and inner support member 132 support the fiber pad 120 from erosion in normal use. Water then enters the interior volume of the filter, that is, within support member 132, and exits via an outlet port 144.

Figure 15:
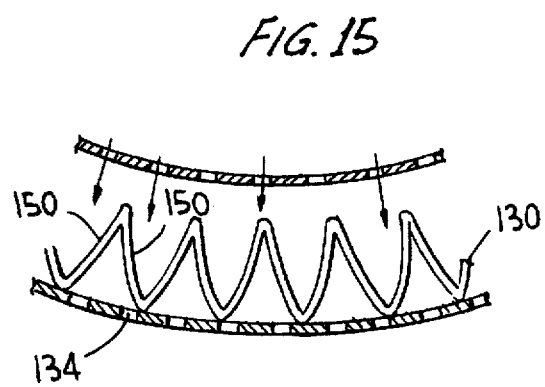
FIG. 15 is a view comparable to FIG. 14 showing the configuration of the filter assembly during backwash.
Figure 14:
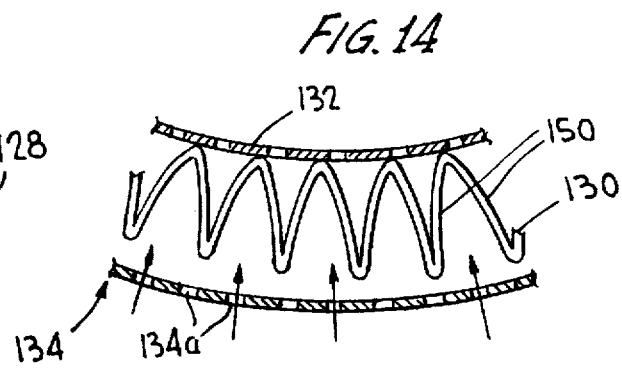
FIG. 14 is a cross-sectional view through a portion of the polishing filter of FIG. 11 showing the configuration of the filter assembly during normal use.

In order to provide additional stiffness to the filter assembly 130, and to increase its surface area, the sandwich assembly of screens 122, 124 and filter element 120 is creased along creasing lines indicated generally at 121, rolled up about an axis of elongation parallel to the creasing lines 121, and has mating ends joined by adhesives or the like, forming a corrugated cylindrical filter assembly 130. The fit of the cylindrical filter assembly 130 between support members 132 and 134 is such that the assembly of the filter element 120 with support members 122, 124 sags against and is supported by the inner member 132 in normal use. See FIG. 14, showing the configuration of assembly 130 during normal use, that is, with water flowing inwardly through the perforations 134a in the outer support member 134. Thus, as shown in FIG. 14, under ordinary circumstances of flow, the assembly 130 of the filter member 120 supported by screens 122, 124 is biased inwardly and is supported by the inner perforated support member 132. During backwash, when backwash water is admitted via the usual outlet 144, the filter assembly 130 is biased outwardly by the flowing backwash water, as shown in FIG. 15, such that the filter assembly 130 is supported by the outer perforated member 134. Individual panels 150 of the cylindrical assembly 130 flex inwardly in normal use (FIG. 14), and outwardly in backwash (FIG. 15); their motion encourages accumulated contaminants, salts, and the like to flake off the assembly in backwash, for removal and further treatment as indicated at 154. The direction of flow can be reversed repetitively during the backwash operation, if needed. During backwash, the polarity of DC power provided by power supply 128 is reversed, allowing more efficient removal of collected salt ions and the like.

As discussed above, it is important to the function of the polishing filter that very small particles, e.g., 0.05-0.1 microns and greater, be removed from the water stream, while permitting the water stream to pass therethrough substantially unimpeded. As indicated, filter member 120 may be made up of extremely fine fibers of a polyester or other thermoplastic polymer material, including polyethylene and polypropylene materials. Ideally, this material could be meltblown as a mat of the thickness desired and heat-bonded to opposed stainless steel screen members 122, 124; this precursor 'sandwich' would subsequently be creased along parallel creasing lines and then rolled to define a corrugated cylindrical filter assembly. It will be appreciated, of course, that other forms of the basic precursor unit would also be highly useful, e.g., flat planar filter members disposed between flat supporting plates might be very useful in certain circumstances.

FIG. 16 shows schematically an apparatus for manufacturing such a fibrous mat faced on either side with metallic screens. Processes for forming a mat of meltblown polymer fibers are known generally in the art. For example, molten polymer, as indicated at 170, is provided to a central passage 172 of a meltblowing die assembly, also comprising passages 174, 176 supplied with compressed air, as indicated at 178. Fine strands of polymer are extruded from a number of small-diameter orifices at the tip of the polymer passage 172, and are drawn down by curtains of compressed air formed at either side thereof to form extremely fine fibers collected as a continuous mat 182 on a moving belt 180. After cooling, the mat 182 is withdrawn from belt 180 and bonded between continuous opposed metallic wire screens 184, 186. Screens 184, 186 are preferably heated, e.g., by contacting heated rollers or the like 188, 190, so that where the screens touch the mat, the mat is bonded to the screens. Heating the mat itself is less desirable because some of the fibers will necessarily fuse to one another, increasing the resistance to flow of water through the mat. The 'precursor sandwich' indicated generally at 192, comprising the mat 182 having the screen members 184, 186 bonded to either side thereof, can then be shaped to form a filter assembly of the desired shape and size; in the preferred embodiment shown, the precursor 192 is corrugated at 194 by creasing at regular intervals, and sections thereof are formed into a cylinder at 196, all generally as discussed above. The invention also includes assemblies of fiber mats and screens formed in other ways.

The fiber assembly could also be replaced entirely or supplemented by a filter element 120 of a pliable polymer organic gel material. For example, the fiber mats could be placed on one or both sides of a suitable gel member. The microstructure of a suitable gel comprises nodes connected by linked molecular fibrils, such that a connected pore structure is formed including pores of sizes suitable to pass water, but trapping ions and coagulated small particles of 0.05–0.1 micron or greater. This organic gel material also requires careful support and would desirably also be faced on either side by relatively flexible metallic screen materials 122, 124 to allow a potential to be applied across the gel, and possibly also by fiber mats, as noted. This assembly would also then be supported between relatively rigid perforated members 132, 134 or the like to define a complete filter assembly capable of being moved between two slightly different configurations upon backwash to dislodge collected contaminants, salts, and the like from the surface thereof.

More specifically, while the polymer organic gel filter element is, as indicated above, a generally planar member confined between relatively flexible metallic screens for support, its molecular morphology may be planar, possibly including layers of different materials, or a more or less homogenous cross-linked structure, or may have a spiral layered structure. The object of the gel is to allow transport of pure water while absorbing 0.05 to 1.0 micron and larger contaminants, including salt anions and metal cations. To this end, the gel may be polarized as in the case of the fiber mat filter element discussed above, by connection of a 6–12 volt DC potential across metal screens in contact with opposite sides of the gel. In a particularly preferred embodiment, the polymerized molecules of the gel are such that upon application of DC of one polarity across the screens, the gel can shrink slightly, contracting the pores thereof so as to efficiently trap contaminants, while upon application of the reverse polarity, possibly of higher voltage, during backwash, these pores expand slightly, allowing the trapped contaminants to be dislodged from the gel. Accordingly, the backwash process, particularly as employed with respect to a filter assembly comprising an organic gel filter element, includes the step of reversing the polarity of the potential applied across the metal screens contacting opposite sides of the gel. The gel thus defines an electrically-controlled, somewhat pliable, semi-permeable water treatment member.

The invention thus provides various embodiments of electro-coalescing/magnetic separation (ECMS) systems for removal of contaminants from water, including desalinization of water. These systems may be assembled of a variety of components disclosed herein and in applicant's prior patents and copending applications, depending on the specific stream to be treated. Of course the individual components may be multiplied as necessary to suit particular process requirements. Various known control components may be provided, as may additional known water treatment steps and components.

Broadly speaking, the process of the invention involves exposing a stream of water to be treated to a strong electric field, to promote oxidation and reduction of contaminants therein, and to begin the coagulation/coalescing process. Ionized materials, which may include ionized oxygen, nitrogen, ozone, and other gaseous materials, or metal ions or the like, may then be introduced into the water stream, after which it may also be exposed to a magnetic field for further coagulation of contaminants therein. A primary and secondary filter assembly comprises a tank having a large bed of polarizable filter media such as finely-divided glass or ceramic particles. DC power is supplied thereto to polarize the media, further attracting electrically charged coagulated particles to the filter media. This filter bed is backflushed from time to time simply by reversing the flow connections. An underdrain assembly allows removal of the water from the bed while retaining the media therein. A final polishing stage involves the steps of passing the water stream through an assembly of a very fine fiber material supported by relatively flexible screen supports, allowing controlled movement of the filter material itself upon backflush. This assembly is supported between relatively rigid support members to confine its movement so as to retain the structural integrity of the filter while permitting enough movement to dislodge collected contaminants from the surfaces thereof.

It will be appreciated that, as indicated above, numerous further variations and modifications on the invention are possible. Accordingly, the invention should not be limited by the specific disclosure herein, but only by the claims which follow.

What is claimed is:

1. A method for removing pollutants from a water stream by non-chemical coagulation and filtration of coagulated pollutants, comprising the steps of:

providing a stream of ionized pollutant-coagulating species;

mixing said stream of ionized pollutant-coagulating species with the water stream;

exposing said water stream having been mixed with said ionized pollutant-coagulating species to electric and magnetic fields; and filtering coagulated pollutants from said water stream by performance of the following steps:

introducing said stream into a settling tank, said tank having at least one inlet port in communication with substantially an uppermost portion of an internal volume thereof, and at least one outlet port, and containing a quantity of a polarizable filtration medium, filling substantially a lower half of the internal volume of said tank;

applying an electric potential to spaced conductive members in contact with said media, polarizing said media; and withdrawing said stream having had pollutants filtered therefrom by said media by means of an underdrain assembly extending over substantially the lowermost portion of the internal volume of said tank, said underdrain assembly defining a plurality of small-dimension openings in communication with conduit means, such that water filtered by said medium passes through said small-dimension openings into said conduit means, said medium being excluded by said small-dimension openings from said conduit means.

2. The method of claim 1, comprising the further step of polarizing said media by applying an electric potential to generally planar conductive members disposed within said tank and conforming to substantial portions of internal walls of said settling tank.

3. The method of claim 1, comprising the further steps of simultaneously exposing a stream of air to electric and/or magnetic fields and ultraviolet radiation, to generate a stream of air having a substantial proportion of ionized oxygen and nitrogen therein, and intimately mixing said stream of air having a substantial proportion of ionized oxygen and nitrogen therein with the water stream.

4. The method of claim 3, wherein said stream of air is mixed with the water stream in a venturi, through which said stream of water is constrained to flow, and having a port at which said stream of air is introduced.

5. The method of claim 1, comprising the further step of exposing said stream of water to an electric field prior to said step of mixing said stream of ionized pollutant-coagulating species with the water stream.

6. The method of claim 5, wherein said stream is exposed to an electric field by passing said stream along an annular passage formed between two coaxial conductive tubes, a DC potential being connected across said tubes.

7. A method for filtering ions, particles, and other contaminants of greater than substantially 0.1 micron mean diameter from a water stream employing a filter assembly to collect said contaminants, and for periodically backwashing said filter assembly to remove collected contaminants therefrom, comprising the steps of:

providing a filter assembly comprising a porous member supported by relatively flexible screen members on opposite sides of said porous member and conforming closely thereto, disposing said filter assembly between relatively rigid spaced perforated support members contacting said relatively flexible screen members on first and second surfaces thereof, and thereby comprising a supported filter assembly, enclosing said supported filter assembly comprising said filter assembly and said relatively rigid support members within a sealed container defining an inlet in communication with a first surface of said supported filter assembly and an outlet in communication with a second surface of said supported filter assembly;

admitting said water stream to said sealed container through said inlet, passing said water stream through said supported filter assembly, and withdrawing said water stream through said outlet, to filter contaminants from said stream in normal use; and periodically changing the direction of flow of water through said sealed container to initiate backwash, such that during backwash the side of said supported filter assembly exposed to influent water in normal use is exposed to backwash water, and filtered contaminants and backwash water are removed from the side of said supported filter assembly exposed to influent water in normal use;

wherein the fit of said filter assembly comprising a porous member supported by relatively flexible screen members between said spaced perforated relatively rigid support members is such that upon backwash said filter assembly is flexed from a position adopted during normal use to a position adopted during backwash, such that said filter assembly moves back and forth between said relatively rigid perforated support members upon periodic changes in direction of flow between normal use and backwash operations, whereby contaminants collected on the surface of the side of said porous member exposed to influent water in normal use tend to be dislodged therefrom during backwash.

8. The method of claim 7, comprising the further step of creasing said filter assembly at regular intervals along parallel creasing lines, defining a corrugated filter assembly.

9. The method of claim 8, wherein said filter assembly is generally tubular and is disposed between coaxial cylindrical relatively rigid support members.

10. The method of claim 9, comprising the further step of sealing said inner and outer perforated cylindrical support members to said sealed container to define an influent plenum between the outer surface of said filter assembly and an inner wall of said sealed container, and an outlet volume bounded by the inner surface of said filter assembly.

11. The method of claim 7, wherein said flexible screen members are electrically conductive screens isolated from one another, and comprising the further step of applying a DC potential across said relatively flexible screen members.

* * * * *